United States Patent
Troy et al.

(10) Patent No.: US 9,197,810 B2
(45) Date of Patent: Nov. 24, 2015

(54) SYSTEMS AND METHODS FOR TRACKING LOCATION OF MOVABLE TARGET OBJECT

(71) Applicant: The Boeing Company, Chicago, IL (US)

(72) Inventors: James J. Troy, Issaquah, WA (US); Scott W. Lea, Renton, WA (US); Daniel James Wright, Mercer Island, WA (US); Gary E. Georgeson, Tacoma, WA (US); Karl Edward Nelson, Shoreline, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 14/672,952

(22) Filed: Mar. 30, 2015

(65) Prior Publication Data

US 2015/0207987 A1   Jul. 23, 2015

Related U.S. Application Data

(62) Division of application No. 13/921,246, filed on Jun. 19, 2013, now Pat. No. 9,043,146.

(51) Int. Cl.

| | |
|---|---|
| *G01S 17/46* | (2006.01) |
| *H04N 5/232* | (2006.01) |
| *G06K 9/32* | (2006.01) |
| *G01S 17/88* | (2006.01) |
| *G06F 17/16* | (2006.01) |
| *H04N 7/18* | (2006.01) |

(52) U.S. Cl.
CPC ............ *H04N 5/23222* (2013.01); *G01S 17/46* (2013.01); *G01S 17/88* (2013.01); *G06F 17/16* (2013.01); *G06K 9/3216* (2013.01); *G06K 9/3241* (2013.01); *H04N 5/23296* (2013.01); *H04N 7/183* (2013.01); *G06K 2009/3225* (2013.01); *Y10S 901/46* (2013.01)

(58) Field of Classification Search
USPC ......................................................... 382/103
See application file for complete search history.

(56) References Cited

U.S. PATENT DOCUMENTS

| | | | | |
|---|---|---|---|---|
| 4,424,943 | A * | 1/1984 | Zwirn et al. | 244/3.11 |
| 4,786,167 | A * | 11/1988 | Rothbone et al. | 356/141.5 |
| 5,673,082 | A * | 9/1997 | Wells et al. | 348/139 |

(Continued)

OTHER PUBLICATIONS

International Search Report and Written Opinion, Int'l Appln. No. PCT/US2014/032503 (foreign counterpart of the parent of the instant divisional application), issued Aug. 19, 2014.

(Continued)

*Primary Examiner* — Shelley Chen

(74) *Attorney, Agent, or Firm* — Ostrager Chong Flaherty & Broitman P.C.

(57) ABSTRACT

An automated process uses a local positioning system to acquire location (i.e., position and orientation) data for one or more movable target objects. In cases where the target objects have the capability to move under computer control, this automated process can use the measured location data to control the position and orientation of such target objects. The system leverages the measurement and image capture capability of the local positioning system, and integrates controllable marker lights, image processing, and coordinate transformation computation to provide tracking information for vehicle location control. The resulting system enables position and orientation tracking of objects in a reference coordinate system.

12 Claims, 14 Drawing Sheets

(56) References Cited

U.S. PATENT DOCUMENTS

| | | | |
|---|---|---|---|
| 5,974,348 A * | 10/1999 | Rocks | 701/28 |
| 6,331,887 B1 * | 12/2001 | Shiraishi et al. | 356/3.03 |
| 6,654,482 B1 * | 11/2003 | Parent et al. | 382/104 |
| 7,643,893 B2 | 1/2010 | Troy et al. | |
| 7,813,830 B2 | 10/2010 | Summers et al. | |
| 7,859,655 B2 | 12/2010 | Troy et al. | |
| 8,199,194 B2 | 6/2012 | Troy et al. | |
| 2003/0011494 A1 * | 1/2003 | Reider et al. | 340/993 |
| 2004/0168148 A1 * | 8/2004 | Goncalves et al. | 717/104 |
| 2007/0276590 A1 * | 11/2007 | Leonard et al. | 701/207 |
| 2008/0148581 A1 * | 6/2008 | Boni et al. | 33/288 |
| 2008/0278445 A1 * | 11/2008 | Sweetser et al. | 345/158 |
| 2009/0086199 A1 * | 4/2009 | Troy et al. | 356/251 |
| 2011/0043620 A1 * | 2/2011 | Svanholm et al. | 348/135 |

OTHER PUBLICATIONS

Whie et al., "A Mobile Climbing Robot for High Precision Manufacture and Inspection of Aerostructures," Int'l J. Robotics Research, vol. 24, No. 7, Jul. 2005, pp. 589-598.

* cited by examiner

SYSTEMS AND METHODS FOR TRACKING LOCATION OF MOVABLE TARGET OBJECT

RELATED PATENT APPLICATION

This application is a divisional of and claims priority from U.S. patent application Ser. No. 13/921,246 filed on Jun. 19, 2013.

BACKGROUND

This disclosure generally relates to systems and methods for tracking the locations of a movable target object (e.g., a crawler vehicle or other electro-mechanical machine that is guided by a computer program) as it moves relative to a workpiece or part.

Applications involving manufacturing processes that use crawler vehicles or other computer-controlled electro-mechanical machines often employ location tracking in a reference coordinate system. Existing location tracking solutions fit into two categories: absolute motion tracking and incremental motion tracking. Absolute motion tracking refers to tracking of position and/or orientation defined in a reference coordinate system, such as an airplane coordinate system. Known techniques for absolute motion tracking include optical motion capture, laser tracking, depth cameras, magnetic tracking, and sonic-based tracking.

Incremental motion tracking measures displacements relative to a prior coordinate measurement. One known technique for incremental motion tracking employs encoders which output pulses in response to incremental movements. In applications that use incremental motion measurement, errors can build up over time. Such error build-up is undesirable in use cases requiring finite error with respect to an absolute coordinate system. There is a need to implement a process that provides accurate, absolute measurement at lower update rates that can be integrated into an incremental motion measurement system running at higher update rates.

Although other absolute measurement systems exist to measure position and orientation using optical or image-based techniques, they usually require multiple cameras placed around the target object. One known absolute measurement system that uses a single "depth" camera has limited range and limited ability to distinguish specific features. It would be advantageous to be able to track position and orientation using a single standard video camera.

SUMMARY

The automated measurement processes disclosed herein provide absolute measurements in systems that generate relative (incremental) tracking data. This application further addresses automated motion tracking and control for vehicles such as surface-crawling vehicles using portable, lower-cost equipment that is easy to set up since it uses a single-camera configuration. When used with odometry (or other relative coordinate measurement), this tracking system can provide an absolute coordinate correction method for motion-controlled vehicles. When used without motion control, it can still provide an automated way of tracking the locations of one or more objects in a large volume.

The automated process uses a local positioning system (LPS) to acquire location (i.e., position and orientation) data for one or more movable target objects while those target objects are at least momentarily stationary (i.e., for long enough that the measurement part of the process can be completed). In cases where the target objects have the capability to move under computer control, this automated process can use the measured location data to correct the position and orientation of such target objects. The system leverages the measurement and image capture capability of the local positioning system, and integrates controllable marker lights, image processing, and coordinate transformation computation to provide tracking information for vehicle location control. The resulting system enables position and orientation tracking of objects in a reference coordinate system, such as tracking of a crawler vehicle on an airplane wing surface. The system provides a low-cost alternative to other types of off-board tracking systems; it is portable, easy to set up and can be operated by a single user.

One aspect of the subject matter disclosed in detail below is a method for determining a current location of a target object in a three-dimensional reference coordinate system when the target object is equipped with at least three active target markers arranged in a known pattern. The method comprises the following steps: (a) defining the location of a camera with respect to the reference coordinate system; (b) capturing an image while the camera is centered on the target object and all of the active target markers are not on; (c) capturing one or more images while the camera is centered on the target object and one or more of the active target markers are on; (d) processing the images to compute a difference image representing differences between the image captured while all of the active target markers were not on and each image captured while one or more of the active target markers were on; (e) computing respective average pixel coordinates for the difference areas in the difference image corresponding to respective active target markers; (f) for respective active target markers, aiming a laser range finder and transmitting a laser beam in the direction defined by respective pan and tilt angles which are a function of at least the pan and tilt angles at which the target object was centered in an image field-of-view of the camera and differences between the respective average pixel coordinates and pixel coordinates of a center of the images; (g) for respective active target markers, acquiring respective range, pan and tilt data subsequent to the transmission of a respective laser beam; (h) computing coordinates of respective points corresponding to the active target markers in the reference coordinate system based on the measured range, pan and tilt data; and (i) comparing respective positions of the respective points whose coordinates were computed from the measured pan, tilt, and range data to respective positions of respective points arranged in the known pattern to determine a current position and orientation of the target object defined in terms of the reference coordinate system.

In accordance with some embodiments, step (c) comprises capturing one image while at least three active target markers are on. In accordance with other embodiments, step (c) comprises capturing respective images while first, second and third active target markers are turned on in sequence.

In accordance with some embodiments, step (d) comprises: segmenting the difference image to include separate areas corresponding to the active target markers based on the differences; and computing respective average pixel coordinates in the difference image for a respective centroid of each separate area corresponding to the active target markers.

In accordance with another aspect, the method described above may further comprise: measuring a point pattern based on relative distances between the points; and computing a first transformation matrix representing the location of the target object in the reference coordinate system based on differences between a measured point pattern and a known point pattern. In some embodiments, the known point pattern is asymmetric.

In accordance with a further aspect, the method described above may further comprise: placing the target object at an initial location; computing a second transformation matrix representing the initial location of the target object relative to the reference coordinate system; moving the target object from the initial location to the current location; computing an inverse of the second transformation matrix; and computing a product of the first transformation matrix and the inverse of the second transformation matrix, the product being a third transformation matrix representing the current location of the target object relative to the initial location of the target object. In accordance with some embodiments, the method further comprises generating encoder pulses in response to incremental motion of the target object during movement from the initial location to the current location.

Another aspect of the subject matter disclosed in detail below is a location tracking system comprising: a pan-tilt mechanism; a camera and a laser range finder mounted to the pan-tilt mechanism; a target object equipped with at least three active target markers; and a computer system programmed with first software for controlling the camera, the laser range finder and the pan-tilt mechanism, second software for processing images acquired by the camera, and third software for controlling motion of the target object and states of the at least three active target markers.

In accordance with one embodiment of the location tracking stem described in the preceding paragraph, the first software comprises routines for commanding the pan-tilt mechanism to aim the camera at the target object and commanding the camera to capture images of the target object; the second software comprises routines for processing captured images to compute a difference image representing differences between an image captured while the active target markers were not on and each image captured while one or more of the active target markers were on; and the third software comprises routines for controlling the state of each of the active target markers. The target object may, for example, comprise a crawler vehicle or a base of a robotic arm. In embodiments in which the crawler vehicle is a holonomic motion crawler vehicle, the system may further comprise means for tracking incremental motion of the crawler vehicle.

Yet another aspect is a location tracking system comprising: a pan-tilt mechanism; a camera and a laser range finder mounted to the pan-tilt mechanism; a target object equipped with at least three active target markers arranged in a known pattern; and a computer system programmed to execute the following operations: (a) adjusting pan and tilt angles of the pan-tilt mechanism to center the camera on the target object with the active target markers within an image field-of-view of the camera; (b) commanding the camera to capture an image while the camera is centered on the target object and all of the active target markers are not on; (c) commanding the camera to capture one or more images while the camera is centered on the target object and one or more of the active target markers are on; (d) processing the images to compute a difference image representing differences between an image captured while the active target markers were not on and respective images captured while one or more of the active target markers were on; (e) compute respective average pixel coordinates for the difference areas in the difference image corresponding to respective active target markers; (f) for respective active target markers, commanding the laser range finder to transmit a laser beam in the direction defined by respective pan and tilt angles which are a function of at least the pan and tilt angles at which the target object was centered in the image field-of-view and differences between the respective average pixel coordinates and pixel coordinates of a center of the indicator image; (g) for respective active target markers, commanding the pan-tilt mechanism to acquire respective pan and tilt data and commanding the laser range finder to acquire respective range data subsequent to the transmission of a respective laser beam; (h) computing coordinates of respective points corresponding to the active target markers in a reference coordinate system based on the measured range, pan and tilt data; and (i) comparing respective positions of the respective points whose coordinates were computed from the measured pan, tilt, and range data to respective positions of respective points arranged in the known pattern to determine a current position and orientation of the target object in terms of the reference coordinate system.

Other aspects of systems and methods for tracking location of a movable target object are disclosed below.

DETAILED DESCRIPTION

Figure 1:
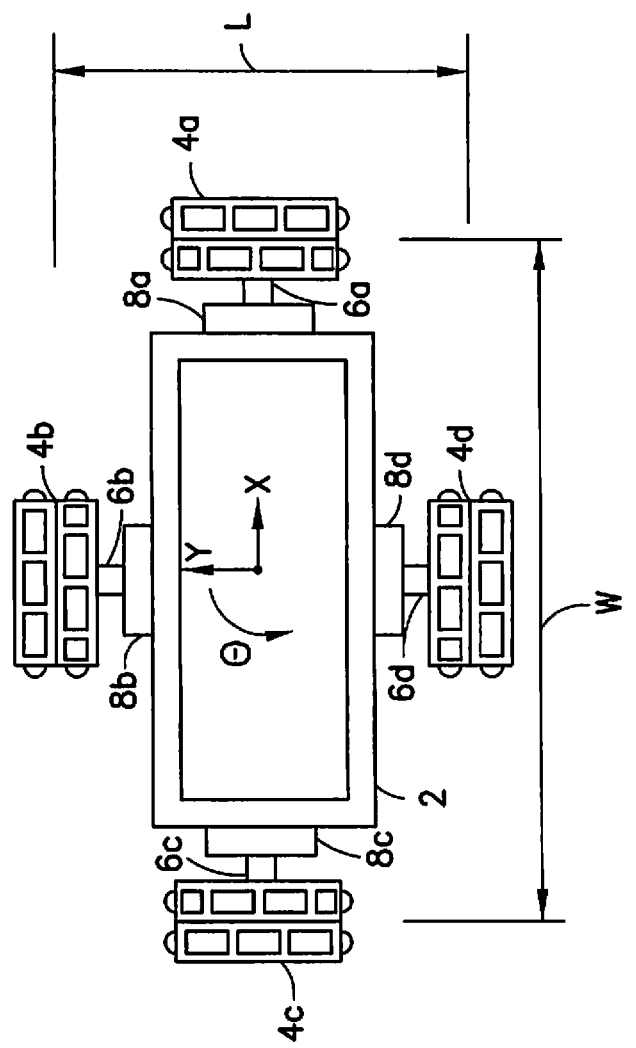
FIG. 1 is a schematic top planar view of some components of a known encoder-equipped mobile device whose incremental movements can be tracked using a dead-reckoning odometry-based process.

Reference will hereinafter be made to the drawings in which similar elements in different drawings bear the same reference numerals.

In accordance with the teachings herein, a location tracking system can be provided which is capable of measuring the location of a movable target object in absolute coordinates following the completion of a motion that was tracked incrementally, e.g., using position encoders. If the absolute coordinate measurement system determines that the current location of the momentarily stationary target object deviates from the desired location by more than a configurable tolerance, the target object can be commanded to move toward the correct location. Accordingly, the absolute coordinate measurement process disclosed herein can be utilized to correct errors in the relative coordinate measurements.

One example of an incremental motion measurement system is a dead-reckoning odometry-based system. Any dead-reckoning solution will have measurement inaccuracies due to small errors that build up over time. These can be caused by systematic errors in the device or disruptions caused by unexpected changes in the environment. FIG. 1 is a schematic top planar view of some components of an encoder-equipped mobile device whose incremental movements can be tracked using a dead-reckoning odometry-based process, as disclosed in U.S. patent application Ser. No. 13/796,584 (the disclosure of which is incorporated by reference herein in its entirety). This device has a four-omni wheel, perpendicular, double-differential configuration. This tracking device can be connected or mounted to an end effector-equipped crawler vehicle (not shown in FIG. 1). The device shown in FIG. 1 comprises a rectangular frame 4 and four double-row omni wheels 4a-4d rotatably mounted to frame 4 by means of respective axles 6a-6d and axle bearings (not shown). Respective encoders 8a-8d measure rotation of the omni wheels 4a-4d. As the omni wheels roll on a surface, the encoders 8a-8d send encoder pulses representing respective encoder counts to an operations control center via an encoder cable (not shown in FIG. 1) after each incremental rotation of each omni wheel. Each encoder will output an encoder count proportional to the angle of rotation of a respective omni wheel. These encoder pulses will be received by a computer system (not shown in FIG. 1, but see FIG. 7) that compute the X and Y coordinates of the device.

The control system stops the device when the counts of encoder pulses indicate that the device has arrived at the desired location. The current location of the stopped device can then be checked to determine to what extent it may deviate from the desired location. In accordance with the teachings herein, corrections can be made to the relative motion measurements by acquiring accurate, absolute measurements at lower update rates. This absolute measurement process (performed while the target object is stopped) can be integrated into a relative motion measurement system running at higher update rates, which acquires relative motion measurements while the target object is moving. In accordance with one embodiment disclosed hereinafter, a lower-update-rate LPS-based process provides corrections to a higher-update-rate odometry system.

The tracking method disclosed herein is an automated process that incorporates active lights on the target object and image processing to compute the target object position and orientation. It uses a local positioning system (LPS) of the type depicted in FIG. 2, which system has a single camera and laser range meter on a controllable pan-tilt unit. The LPS operation and calibration process is disclosed in U.S. Pat. No. 7,859,655 (the disclosure of which is incorporated by reference herein in its entirety).

Figure 2:
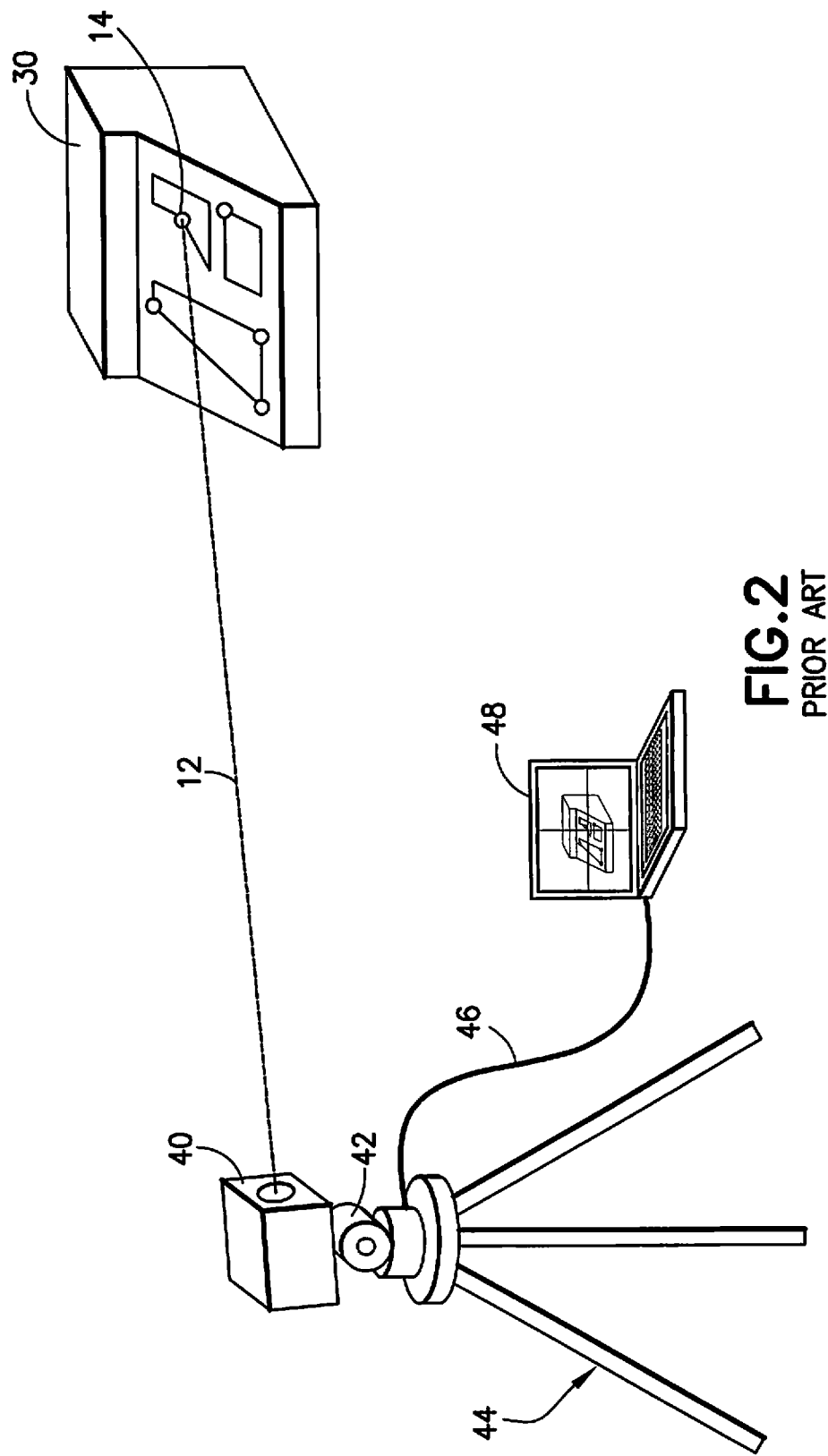
FIG. 2 is a schematic isometric view of a known local positioning system aimed at a target object.

More specifically, the local positioning system depicted in FIG. 2 comprises a video camera 40 which may have automated (remotely controlled) zoom capabilities. The video camera 40 may additionally include an integral crosshair generator to facilitate precise locating of a point within an optical image field display of the video camera. The video camera 40 is supported on a pan-tilt mechanism 42. The video camera 40 and the pan-tilt mechanism 42 may be operated by a computer 48. The computer 48 communicates with the video camera 40 and the pan-tilt mechanism 42 through a video/control cable 46. Alternatively, the computer 48 may communicate with video camera 40 and pan-tilt mechanism 42 through a wireless communication pathway (not shown). The pan and tilt angles of the pan-tilt mechanism 42 and, therefore, the orientation of the video camera 40 can be controlled using the keyboard of computer 48 or other input device. The optical image field, with crosshair overlay, as sighted by the video camera 40, can be displayed on the monitor of computer 48.

The pan-tilt mechanism 42 is controlled to positionally adjust the video camera 40 to selected angles around a vertical, azimuth (pan) axis and a horizontal, elevation (tilt) axis. A direction vector 12, that describes the orientation of the camera relative to the fixed coordinate system of the tripod 44 (or other platform on which the pan-tilt unit is attached), is determined from the pan and tilt angles, as well as the position of the center of crosshair marker in the optical field when the camera is aimed at a point of interest. This direction vector 12 can be depicted as a line extending from the lens of the camera 40 and intersecting a location on a target object 30.

A laser range meter may be incorporated inside the housing of camera 40 or mounted to the outside of camera 40 in such a way that it transmits a laser beam along the direction vector 12. The laser range meter is configured to measure distances to the target object 30. The laser range meter may have a laser and a unit configured to compute distances based on the laser light detected in response to a laser beam reflected by the target object 30.

The local positioning system shown in FIG. 2 further comprises three-dimensional localization software which is loaded into computer 48. For example, the three-dimensional localization software may be of a type that uses multiple calibration points 14 on the target object 30 to define the location (position and orientation) of video camera 40 relative to target object 30. The calibration points 14 may be visible features of known position in the local coordinate system of the target object 30 as determined from a three-dimensional database of feature positions (e.g., a CAD model) or other measurement technique. During the LPS calibration process, X, Y, Z data for at least three non-collinear points are extracted from the CAD model. Typically calibration points are selected which correspond to features that can be easily located on the target object. The three-dimensional localization software utilizes the X, Y, Z data of the calibration points 14 and the pan and tilt data from the pan-tilt mechanism 42 to define the relative position and orientation of the video camera 40 with respect to the local coordinate system of the target object 30. The measured distances to the calibration points 14 may be used in coordination with the pan and tilt angles from the pan-tilt mechanism 42 to solve for the camera position and orientation relative to the target object 30. A method for generating an instrument to target calibration transformation matrix (sometimes referred to as the camera pose) is disclosed in U.S. Pat. No. 7,859,655 (the disclosure of which is incorporated by reference herein in its entirety). Using the known and measured data, the calibration process (set forth in more detail in the Appendix) computes the 4×4 homogeneous transformation matrix that defines the position and orientation of the camera relative to the target object.

Once the position and orientation of the video camera 40 with respect to the target object 30 have been determined and a camera pose transformation matrix has been generated, camera pan data (angle of rotation of the video camera 40 about the azimuth axis) and tilt data (angle of rotation of the video camera 40 about the elevation axis) may be used in conjunction with the calculated position and orientation of the video camera 40 to determine the X, Y and Z coordinates of any point of interest on the target object 30 in the coordinate system of the target object.

Figure 3:
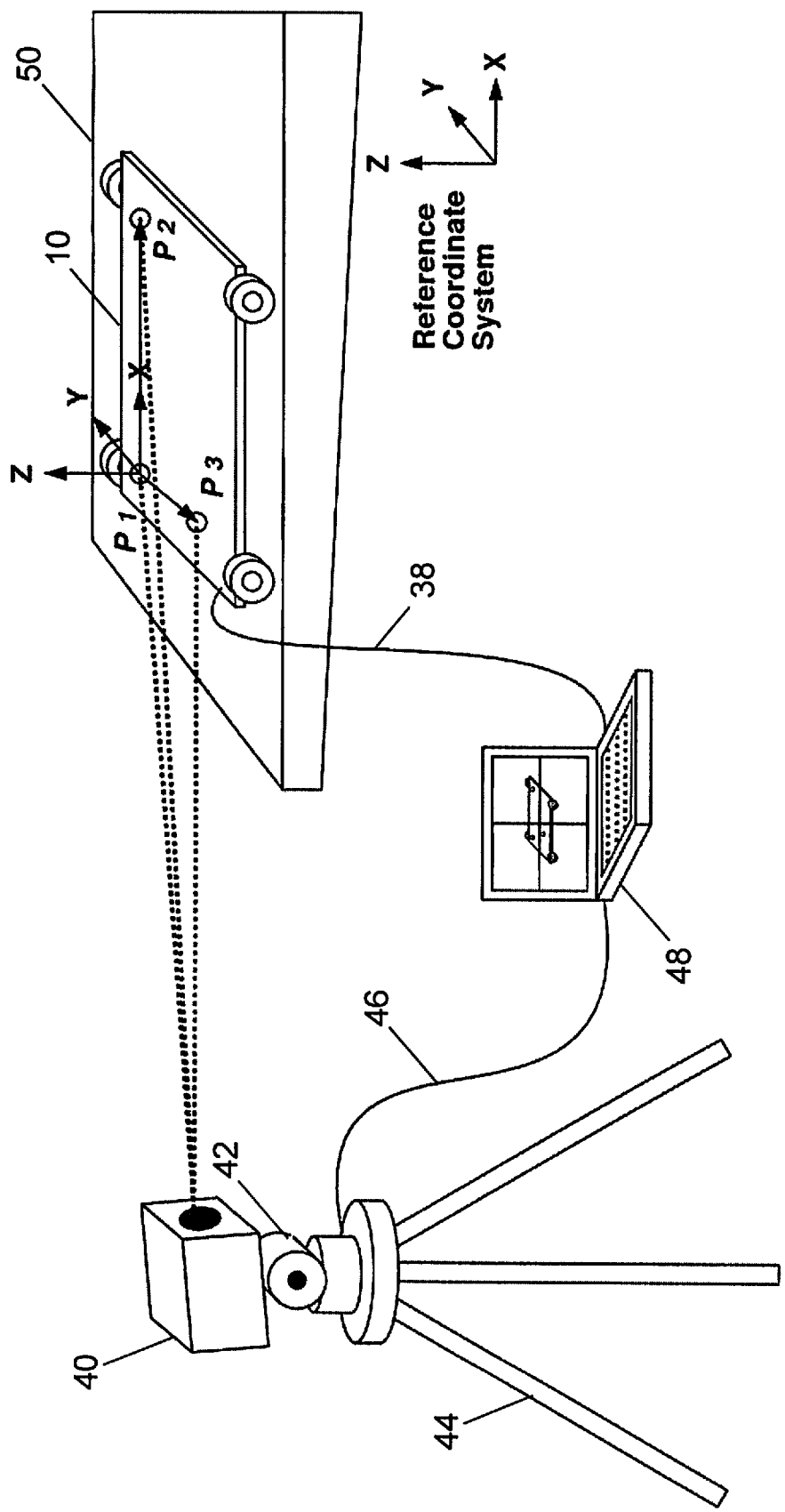
FIG. 3 is a schematic isometric view of a system for tracking and controlling the motion of a crawler vehicle using a local positioning system in accordance with one configuration.

The foregoing localization and motion tracking processes can be extended and applied in an analogous manner to determine the X, Y and Z coordinates of any point of interest on a target object in an absolute (reference) coordinate system. For example, a local positioning system can be used to track the motion of a crawler vehicle 10 which is moving on a wing 50 of an airplane in the reference coordinate system of the airplane, as depicted in FIG. 3. More specifically, the local positioning system can track the location of the origin of the crawler vehicle coordinate system in the reference coordinate system of the airplane. The X, Y and Z values in the aforementioned transformation matrix are computed based on the difference in position of the origin of the crawler vehicle coordinate system from an initial position to a current position. The origin can be defined anywhere on the crawler vehicle (or other target object). In FIG. 3, the crawler vehicle coordinate system origin is shown to be at point P1.

In addition to the LPS control software, the computer 48 is programmed with image processing software capable of detecting differences between sets of images acquired by the video camera 40. In cases where motion control is combined with motion tracking, the computer 48 is further programmed with crawler motion control software that communicates with processors onboard the crawler vehicle 10 via an electrical cable 38. In the alternative, the LPS control software, image processing software and crawler motion control software can run on separate computers or processors that communicate through a network or bus.

The automated absolute measurement process works by capturing a sequence of images with active lights (referred to hereinafter as "active target markers"), for example, computer-controlled light-emitting diodes (LEDs) attached to the surface of target object that is momentarily stationary. In the example shown in FIG. 3, the positions of three active target markers are indicated by points $P_1$, $P_2$ and $P_3$.

Figure 4:
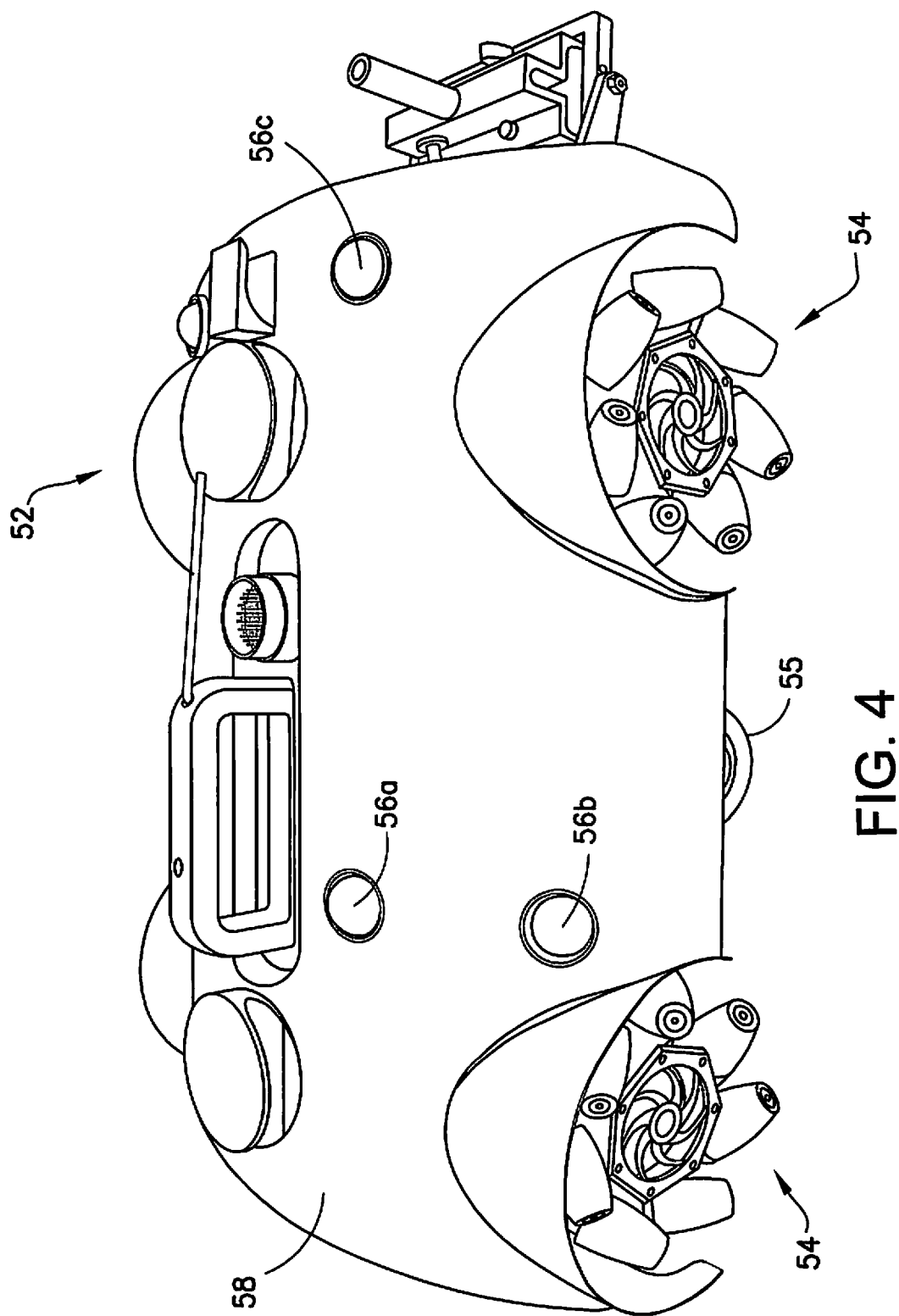
FIG. 4 is a schematic perspective view of a crawler vehicle that has respective sets of three active target markers on each side (only one set is visible). In accordance with the embodiment depicted, the active target markers are LED lights.

FIG. 4 is a schematic perspective view of a holonomic motion crawler vehicle 52 that has four Mecanum wheels 54 (only two are visible), four omni wheels 55 (only one is visible in FIG. 4), two suction zones under the vehicle (not shown), and respective sets of three LED lights 56a-c on each side (only one set is visible in FIG. 4). (Details concerning the structure and function of a holonomic motion crawler vehicle of the type depicted in FIG. 4 are disclosed in U.S. patent application Ser. No. 13/210,899, the disclosure of which is incorporated by reference herein in its entirety.) In accordance with the embodiment depicted in FIG. 4, the LED lights 56a-c are arranged in a asymmetric pattern on the cover of the crawler vehicle. Each LED light has a generally hemispherical bulb that projects above the cover 58 of the crawler vehicle 52.

The absolute measurement process is implemented by acquiring an image with the LED lights 56a-c off and then turning the lights on and acquiring another image (or vice versa). Two variations of the process have been developed: one in which all the lights are turned on at the same time, and another in which the lights are turned on in a specific sequence. The first way is slightly faster. It employs a light pattern on the surface of the target object that is asymmetric. The second method is more robust in differentiating between the lights and does not require the light pattern to be asymmetric.

The absolute measurement system produces position and orientation data at finite time intervals. The time interval between successive measurements depends on the distance that the pan-tilt motors have to move between target points, the update rate of the laser range meter, and speed of the image processing. The duration of the measurement cycle can be improved by using faster image processing and a faster laser range meter. The system can be used to track the locations of multiple target objects, but the more target objects that are tracked, the longer the time between updates to each target object.

Before the absolute measurement process begins, the camera can be tested to determine the appropriate distortion correction to compensate for warping in the image due to the optics differing from an ideal "pin-hole" camera. Also the local positioning system will have been calibrated to the desired reference coordinate system (such as airplane coordinates). This provides the camera pose relative to the target object and is represented as a 4×4 homogeneous transformation matrix.

Figure 5A:
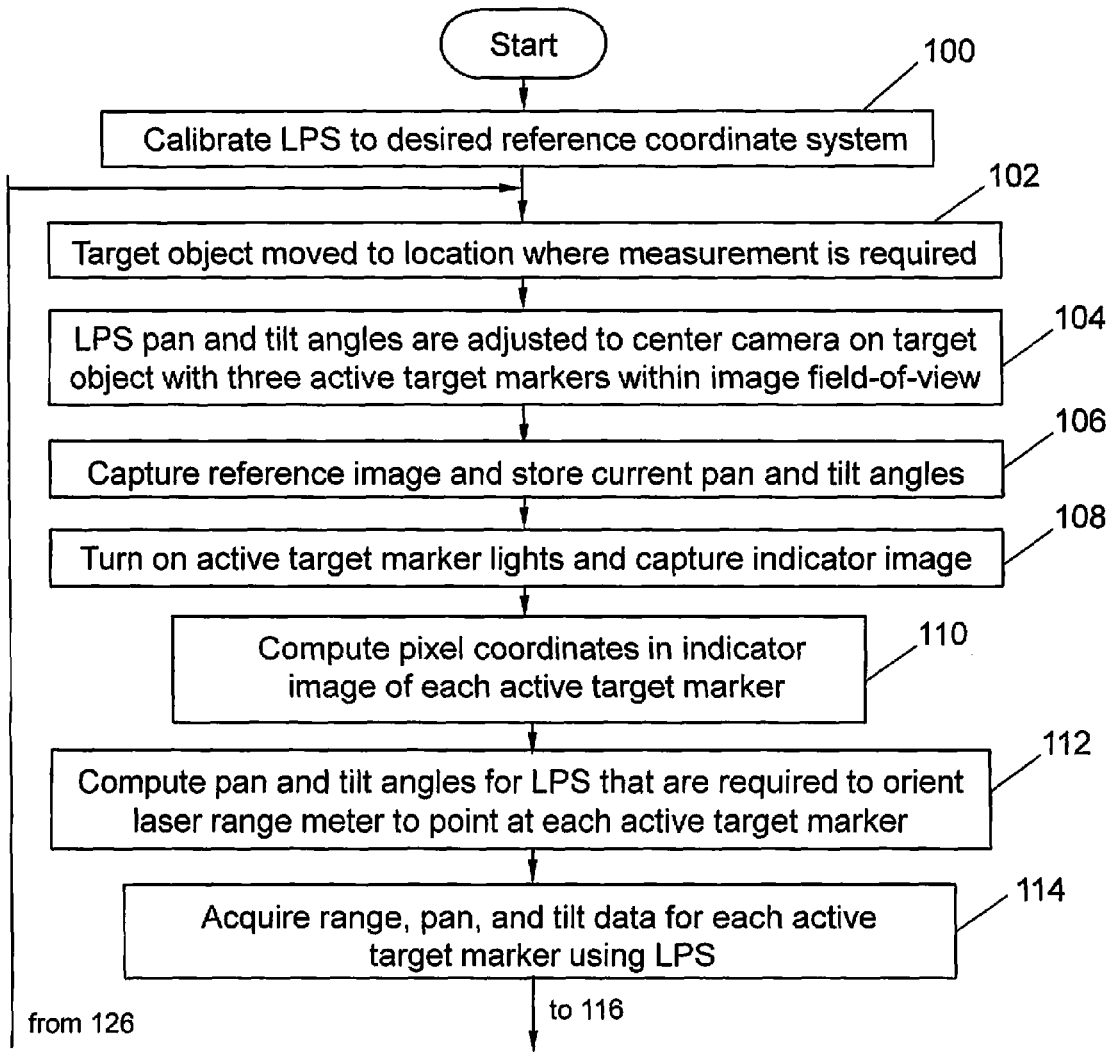
FIG. 5 shows the mutual relationship of FIGS. 5A and 5B, which include respective portions of a flowchart showing steps of an automated location measurement process in accordance with the one embodiment.
Figure 5:
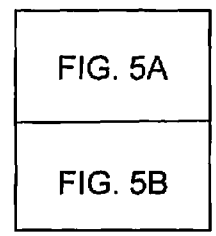
Figure 5B:
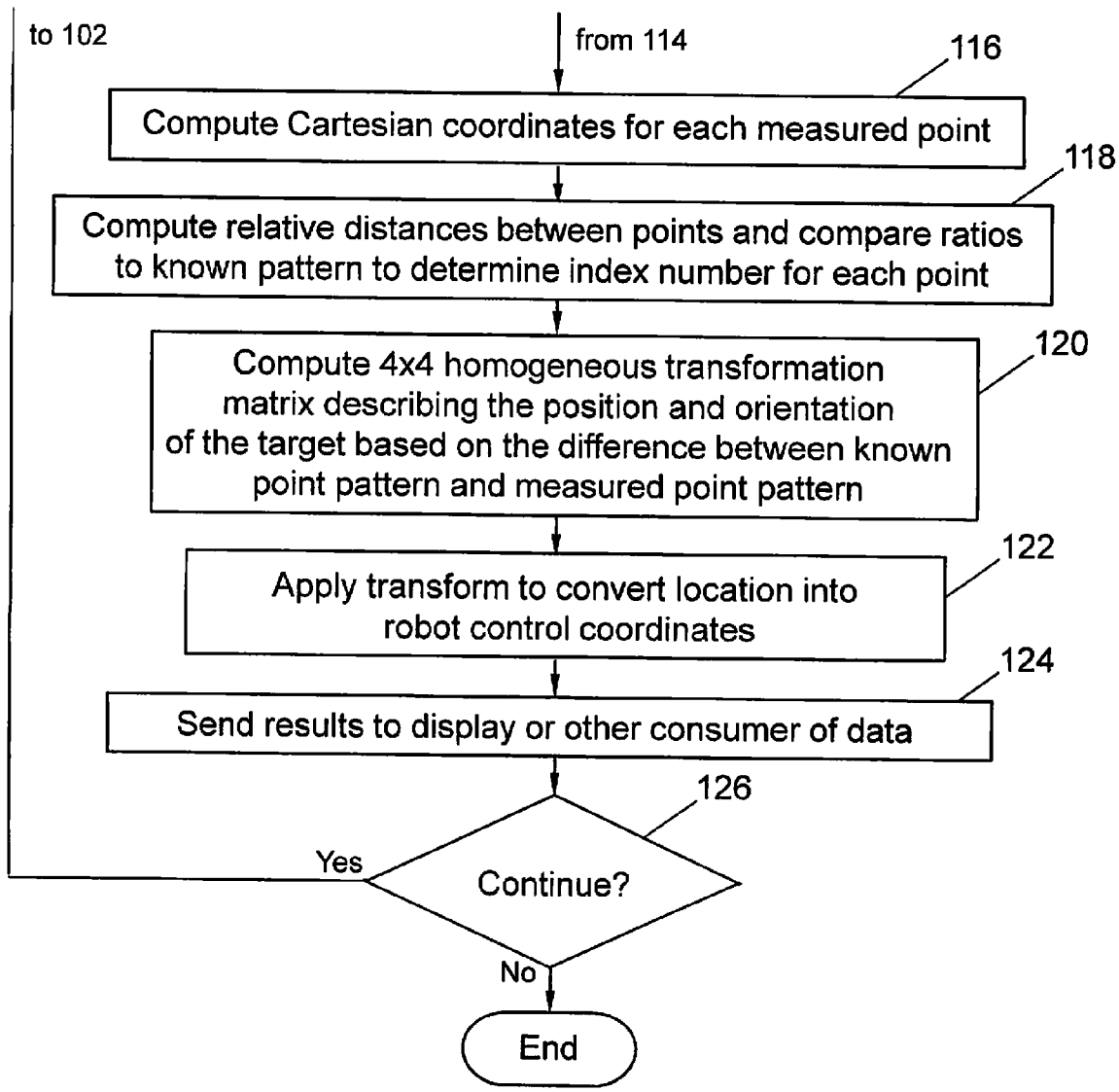

The main elements of an automated absolute measurement process in accordance with one embodiment are shown in FIGS. 5A and 5B. Referring to FIG. 5A, first the local positioning system is calibrated to the desired reference coordinate system (e.g., an airplane coordinate system) (step 100) using the methodology previously described. Then the target object (e.g., a crawler vehicle) is moved toward a desired location and stopped when an incremental motion measurement system indicates that the current location is sufficiently close to the desired location (step 102). For that current location, the local positioning system will determine the position and orientation of the crawler vehicle in the reference coordinate system. In step 104, the direction vector of the local positioning system is changed (using the pan and tilt axes) to ensure all active targets are within the field-of-view. More specifically, the LPS pan and tilt angles are adjusted to center the camera on the target object so that the three active target markers (mounted in a pattern on the target object) are within the image field-of-view. For the purpose of illustration, the following further description of the measurement process will assume that the active target markers are lights (e.g., LEDs).

With all active target markers in the image field-of-view, the process of acquiring image data is initiated. This process involves light activation and image capture. In step 106, a reference image is captured while the lights off and the current pan and tilt angles are stored. In steps 108, the lights are turned on and one or more indicator images are captured (using the same pan and tilt angles as were used in step 106). Alternatively, the reference image can be captured while the lights are on and the indicator image can be captured while the lights are off. The indicator image (or images) may be captured using either of two techniques. In accordance with one technique, the lights are cycled one at a time and separate images of the target object are captured for each state (i.e., if three lights are utilized, there will be three separate states of the target object and three separate images). In accordance with another technique, the target object is equipped with a set of lights which are arranged in an asymmetric pattern and a single image is captured while all lights in the set are turned on.

Figure 6:
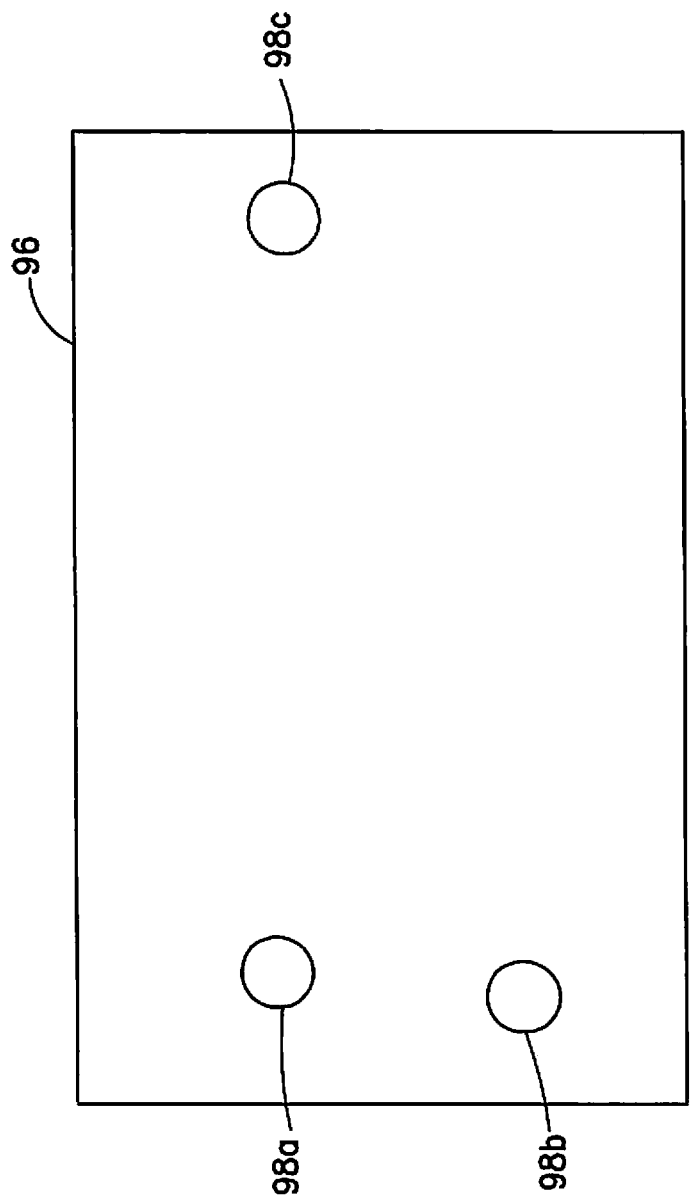
FIG. 6 is a diagram representing an intermediate image processing result produced using the crawler vehicle shown in FIG. 4 in accordance with the process depicted in FIG. 5.

Still referring to FIG. 5A, the pixel coordinates of each light relative to the indicator image are computed (steps 110) by processing the acquired image data. First, distortion function correction is applied to each image (using information about the optics). Second, compute a difference image representing the differences between the reference image and the indicator image or images. Third, the difference image is segmented into separate areas, which may include filtering using size, color, shape, or other parameters. Image segmentation means defining a group of pixels with a specific characteristic. In accordance with one implementation, pixels of a specific color and intensity that are next to each other (i.e. contiguous regions) are found. The difference image will also have some small artifacts (such a subtle edge outlines) that will be filtered out. This can be done using a blur filter and an intensity threshold filter. The results of the segmentation are shown in the segmented image 94 schematically depicted in FIG. 6. The three circles represent segmented regions 98a-c in the image that correspond to the LED lights 56a-c on the crawler vehicle 52 depicted in FIG. 4. (For simplicity, the segmented regions in FIG. 6 are shown as circles, but in practice some or all of the segmented regions in the image will not be perfect circles since the direction vector of the camera will rarely be perfectly aligned with the axis of symmetry of the lights.) After the image has been segmented, the computer calculates the centroid for each segmented region 98a-c. The centroid is the average X pixel coordinate and average Y pixel coordinate for that region. These X-Y coordinate pairs are used to compute the differences from the X-Y coordinate pair for the center of the image.

Referring again to FIG. 5A, once the average pixel coordinates for each segmented region have been calculated, respective pan and tilt angles for each segment centroid position location in the image are computed (step 112). These are the pan and tilt angles of the pan-tilt mechanism that will be used to orient (i.e., direct) the laser range finder of the local positioning system at each active target marker on the target object. The LPS pan-tilt angles for the center of the image are already known, along with the distance to the target object (from step 104). The method for guiding the local positioning system to aim at each of the active target markers (i.e., the LEDs) uses the pixel offsets for each of the centroids from the center of the image, the current field-of-view angle of the camera, and the distance to the target at the center of the image to compute offset pan and offset tilt angles, which are fed to the local positioning system by the computer. The computer instructs the local positioning system to perform automated LPS measurement of the locations corresponding to the centroids of the segmented regions using the offset pan and offset tilt angles. This means that the laser range finder is aimed at each active target marker in turn and the range, pan and tilt data for each active target marker is measured (step 114).

Referring now to FIG. 5B, based on the measured range, pan and tilt data, the Cartesian coordinates of the active target markers (in the reference coordinate frame) are computed (step 116). Then the relative distances between the coordinates of the centers of the active target markers are computed and their ratios are compared to corresponding ratios of the known pattern to determine a respective index number for each point (steps 118). If separate images were acquired while the lights were turned on in sequence, the image segments are numbered using the image order. Alternatively, if a single image was acquired while all lights were concurrently on, the distance vectors between the measured points are computed using the Cartesian coordinates for each measured point, and compared to the points in the known pattern of light positions on the target object.

Prior to the indexing step, the local positioning system has measured the three known points on the target object and converted them into Cartesian (X,Y,Z) coordinates defined in the reference coordinate system. To use these points for comparison to their reference positions, each of the measured points must be associated with the appropriate reference point for the pattern. But the order in which the points were measured may be different from one time to the next, depending on the orientation of the crawler relative to the LPS camera. To address this potential correspondence mismatch, the measured points will be re-ordered to match the sequence of the reference points. This will be done by comparing of the ratio of the relative distances (vector length) of the measured points to the ratio of the relative distances of the reference points. The measured points will then be re-ordered (i.e., array indices changed) to match the reference point order.

Once the re-indexing has been completed, a 4×4 homogeneous transformation matrix describing the current position and orientation of the target object is computed based on the difference between the known initial point pattern and measured point pattern (step 120). This process is described in detail in the Appendix.

Still referring to FIG. 5B, the transformation matrix computed in step 120 is applied to convert the computed location into robot control coordinates (step 122). The transformation matrix computed in step 120 is defined in terms of the reference coordinate system, but the motion path for the crawler vehicle may be defined in terms of an initial starting point that is not the same as the origin of the reference coordinate system. If that is the case, then the inverse of the transformation matrix describing the initial location relative to the reference coordinate system pre-multiplies the transformation computed in step 120, which defines the current location of the target object relative to the reference coordinate system. The result is a transformation describing the current location relative to the initial location. This calculation is shown in the following equation:

$$_C^I T = (^R_I T)^{-1} {}^R_C T$$

where T represents a 4×4 homogeneous transformation matrix; and the R, I, and C subscript/superscripts represent the reference, initial, and current locations, respectively.

The data representing the current position and orientation of the target object are then sent for display or other processes that may use the data (step 124).

The flowchart presented in FIGS. 5A and 5B describes the above method for the case where the lights are in an asymmetric pattern on the target object and are activated simultaneously for the indicator image.

Figure 14A:
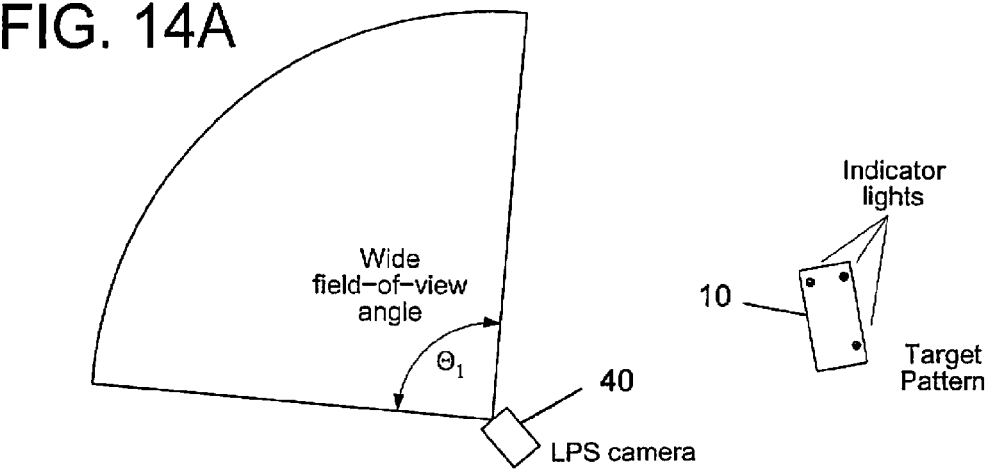
FIGS. 14A-C are diagrams showing an automated search and frame process for setting an appropriate camera field-of-view (zoom value) to ensure that all of the active target markers are just inside the extents of the image frame of the LPS camera.
Figure 14B:
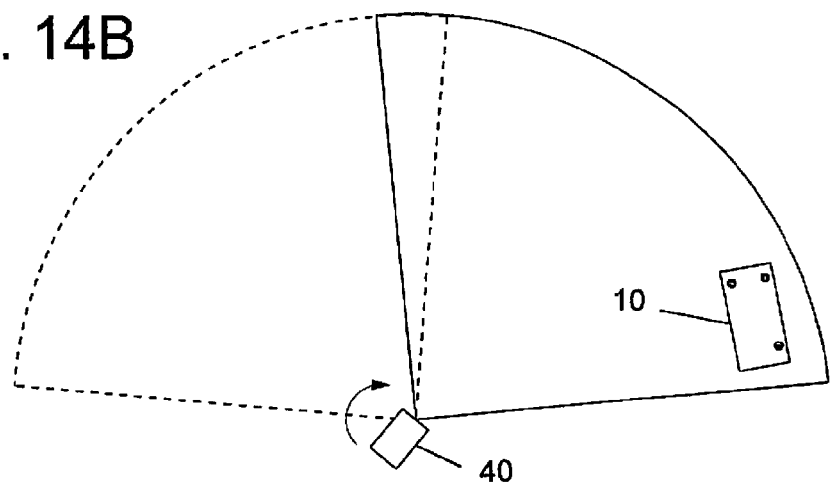
Figure 14C:
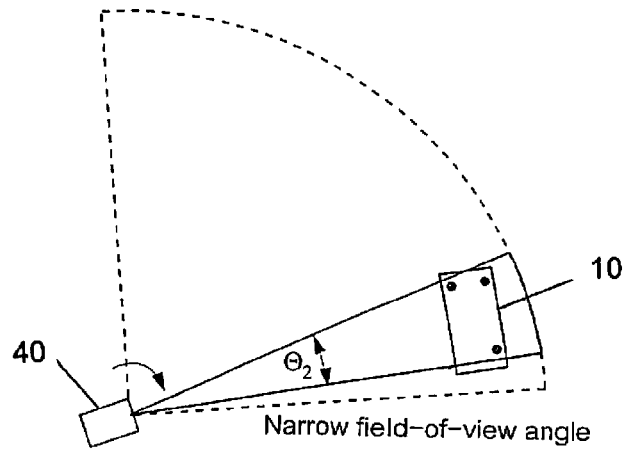

In step 104 of FIG. 5A, the process for changing the direction vector of the local positioning system to aim the camera at the target object involves determining the pan and tilt angles of the LPS pan-tilt mechanism and setting an appropriate camera field-of-view (zoom value) to make sure that all of the markers are just inside the extents of the image frame. This can be performed manually, by having an operator adjust the pan, tilt, and zoom controls to frame the indicator lights within the field-of-view of the LPS camera. Alternately, an automated search and frame process can be performed by the system to take the manually performed steps out of the loop. This automated process is shown in FIGS. 14A-C and described next. As seen in FIG. 14A, the process starts by setting a wide field-of-view angle ($\theta_1$) and capturing one image with the marker pattern indicator lights off and another with the indicator lights on. A difference image is computed to determine if the indicator lights are within the current field-of-view of the camera. If the indicator lights are not found, the LPS aim direction is changed using the pan-tilt mechanism (not shown) to rotate the camera 40 to view another region in the workspace, where the new field-of-view region may partially overlap the previous field-of-view region (shown in FIG. 14B), after which the two images of the environment are captured while the indicator lights are cycled, as before. This search process involving rotation of the aim direction and cycling of the indicator lights continues until the marker pattern is located in the environment. The final step (shown in FIG. 14C) is to center the aim direction between the extents of the lights and then narrow the camera field-of-view ($\theta_2$) to frame all of the lights.

If the motion of the target object is controllable by a computer, then the following additional steps can be performed: (1) compute the required correction movement relative to the current location of the target object; (2); send the data representing the desired change in location to the onboard processor or processors that control the motion of the target object; (3) track the incremental movements of the target object as it moves toward the corrected location; and (4) after the incremental motion measurement system indicates that the target object has arrived at the corrected location, the target object is stopped and then the absolute measurement process may be run again to confirm that the new current location and the corrected location of the target object are within a configurable tolerance.

Figure 7:
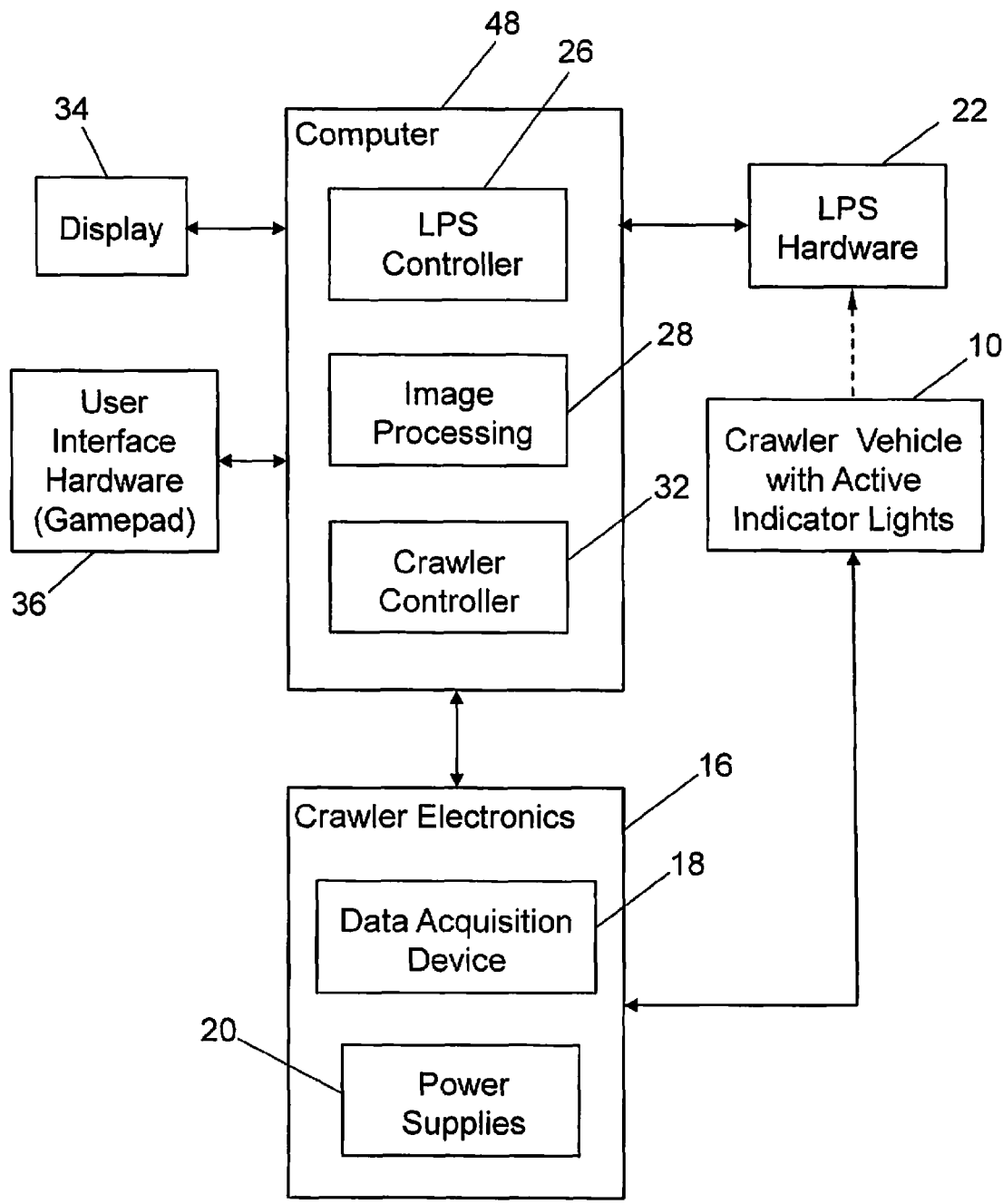
FIG. 7 is a block diagram showing a system configuration in which a single computer runs multiple processes. (Alternatively, each process could be run on separate computers or processors.)

FIG. 7 is a block diagram showing a system configuration in which a single computer 48 runs multiple processes. (Alternatively, each process could be run on separate computers or processors.) The single computer 48 is programmed with LPS control software which, when run, enables the computer to act as an LPS controller 26; image processing software 28; and crawler control software which, when run, enables the computer to act as a crawler controller 32. The system operator may interface with the computer 48 by means of a keyboard of the computer or other user interface hardware 36 (e.g., a gamepad).

The LPS controller 26 controls the operation of the LPS hardware 22, including a laser range finder, a video camera and a pan-tilt mechanism. The dashed arrow in FIG. 7 represents light being generated by the active target markers on the crawler vehicle and viewed by the video camera (during the image acquisition step), as well as the reflection of the laser beam off the targets to the laser range finder of the LPS hardware 22 during the measurement process.

The image processing software 28 performs the operations involved in the performance of steps 110 shown in FIG. 5A, that is, distortion function correction, image differencing, image segmentation, and calculating the pixel coordinates of the centroid of each image segment. The system further comprises a display monitor 34 for displaying acquired images.

The crawler controller 32 controls the operation of the crawler vehicle 10, including activation of indicator lights, control of stepper motors that drive rotation of a set of Mecanum wheels, and control of suction devices. The crawler vehicle may further comprise a set of omni wheels and a corresponding set of wheel rotation encoders, as previously described with reference to FIG. 1. Encoder pulses representing encoder counts are sent from the wheel rotation encoders to a data acquisition device 18 of a crawler electronics system 16 via an electrical cable. The crawler vehicle 10 receives electrical power from power supplies 20 of crawler electronics system 16 via the same electrical cable.

While the crawler vehicle 10 is moving, the data acquisition device 18 receives the encoder counts and converts them into signals having a format acceptable to the computer 48. Based on the encoder count data, the crawler controller 32 computes the absolute angle $\theta$ and changes in relative positions $\Delta P_x$ and $\Delta P_y$ of the crawler vehicle 10 at each update step, and then uses the absolute angle and changes in relative position to compute the absolute position $P_x$ and $P_y$ of one point on the crawler vehicle. Then using $\theta$, $\Delta P_x$ and $\Delta P_y$, the absolute position can be computed using a rotation matrix as disclosed in U.S. patent application Ser. No. 13/796,584.

If the crawler controller 32 determines that the encoder counts indicate that the crawler vehicle 10 has arrived at its target location, the crawler controller 32 commands the crawler vehicle 10 to stop (step 102 in FIG. 5A). Then the LPS controller 26 commands the LPS hardware 22 to adjust the pan and tilt angles to aim the video camera on the target object (step 104 in FIG. 5A) and then capture the reference image (steps 106 in FIG. 5A). The crawler controller 32 then activates the lights onboard the crawler vehicle 10, following which the LPS controller 26 commands the LPS hardware 22 to capture the indicator image (steps 108 in FIG. 5A). The computer then runs an image processing routine that computes the pixel coordinates of the lights in the indicator image (step 110 in FIG. 5A). The LPS controller 26 then computes respective pan and tilt angles for each segment centroid position location in the image (step 112 in FIG. 5A), acquires the range, pan and tilt data for each active target marker (step 114 in FIG. 5A), and computes Cartesian coordinates for each measured point (step 116 in FIG. 5B). The routines for performing steps 118, 120 and 122 shown in FIG. 5B may be part of the LPS control software, the image processing software, or a separate software module.

The initial aiming of the LPS video camera at the target object can be performed using information about the estimated location of the crawler vehicle provided by the localization process involving the incremental wheel encoder data. This aim direction only needs to be approximate, since the image processing and measurement will determine the actual location. If the initial estimated location does not provide a camera view that includes the entire set of active target markers, adjustments in the camera field-of-view can be made (e.g., widening the zoom level), along with a re-centering of the view, so that all active target markers are visible, similar to the centering and framing process described above with reference to FIGS. 14A-C.

Figure 8:
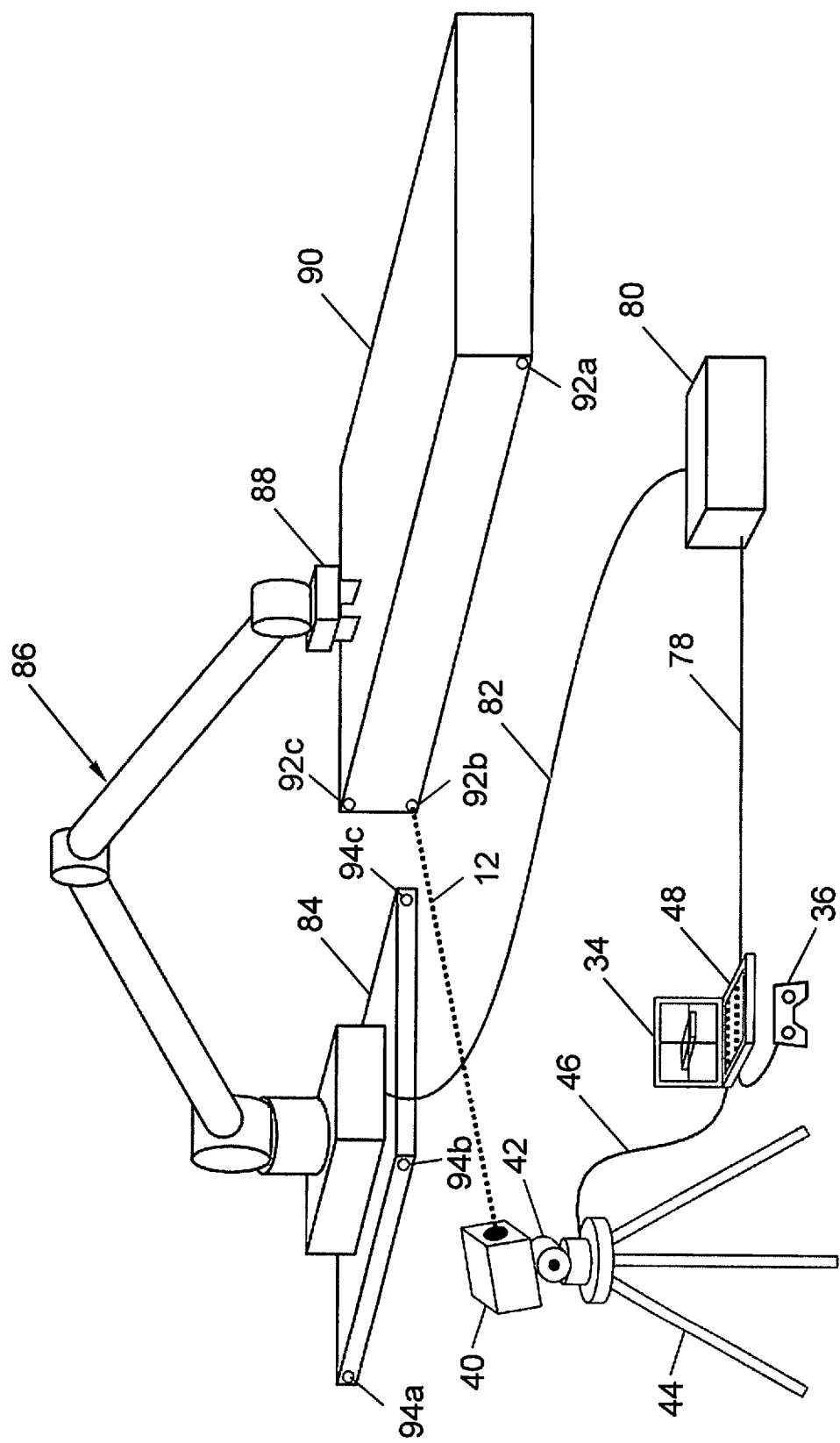
FIG. 8 is a schematic isometric view of a system capable of executing a robot-to-part localization process in accordance with another configuration.

The techniques disclosed above can also be used to determine the position and orientation of a robotic arm relative to a workpiece (hereinafter "part"). As shown in FIG. 8, the local positioning system can be used to determine the relative offset between a part 90 and the base 84 of a robotic arm 86 that may carry an end effector 88 on a distal end thereof. The robot controller 80 controls the robotic arm 86 and operates the end effector 88 for performing machining operations on the part 90.

The basic process sequence is as follows: (1) The local positioning system calibrates to the coordinate system of the part 90 by measuring three known points 92a-c on the part. (2) The local positioning system measures three known points 94a-c on the robot base 84. (3) The LPS control software running in computer 48 computes the location of the robot base 84 relative to the coordinate system of the part 90. (4) The computer 48 sends the location data to a robot controller 80.

The LPS control software on computer 48 outputs the point data as X, Y and Z values, but control applications need more than just X, Y and Z data points to provide the position and orientation of the part. To solve the position and orientation problem, the X, Y and Z data from the three measured points 92a-c and the known dimensions of these points are used to compute the full 6-degrees-of-freedom position and orientation representation. This is what the previously described localization software does. The position and orientation format that the localization software uses is a 4×4 transformation matrix, but there are other ways to represent the data.

The localization methodology disclosed above also has application to robotic systems other than crawler vehicles. Commercial robotics applications used for production tasks have a way to define the location of the robot and other parts relative to the origin of the workcell. This will include both position and orientation offset definitions. There are many equivalent ways to define this offset information, such as: 4×4 transformation matrices, quaternions+translation, angle-axis+translation, or Euler angles+translation. The localization process described above can be modified to output in whatever format is acceptable to the robot controller 80.

A socket connection may be used to transfer the data from the computer 48 to the robot controller 80, but for commercially available applications, a file may work equally well. Some controllers may have an API that accepts incoming data over a socket; other controllers may only allow offset data to be read from a file. Accordingly, in accordance with some embodiments, a file sharing approach can be used.

Figure 9:
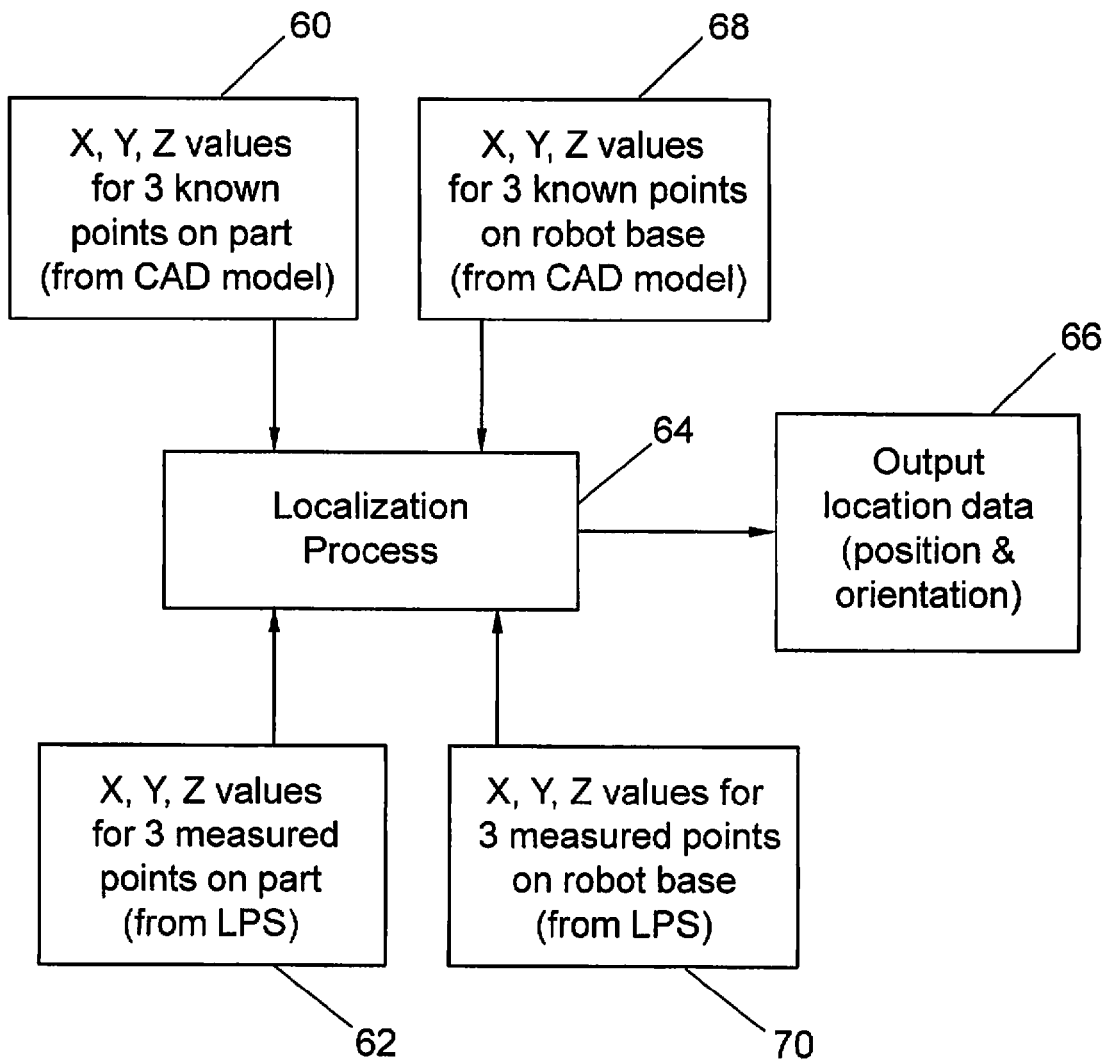
FIG. 9 is a flowchart showing steps of a robot-to-part localization process that employs a local positioning system of the type depicted in FIG. 8.

One exemplary procedure using manual point measurement (depicted in FIG. 9) is as follows: (1) acquire and store the three visible reference points 92a-c on the part 90 (step 60) and the three visible reference points 94a-c on the robot base 84 (step 68) (steps 60 and 68 are performed once for each set of reference points); (2) use the local positioning system to take measurements of the three reference points 92a-c on the part 90 (step 62) when the part is in the desired location (this is equivalent to a standard LPS calibration); (3) use the local positioning system to take measurements of the three reference points 94a-c on the robot base 84 (step 70) when the robot base is in the desired location; (4) use the localization process 64 to compute the position and orientation offset of the part 90 relative to the robot base 84; and (5) send the position and orientation offset data to the robot controller 80 (step 66).

An exemplary procedure for automated point measurement is as follows: (1) acquire and store the three visible reference points 92a-c on the part 90 and the three visible reference points 94a-c on the robot base 84 (this is done once for any set of reference points), the visible reference points being defined LED locations; (2) use the local positioning system to take one picture of the LED pattern on the part 90 with the LEDs turned on and another with the LEDs off; (3) use the local positioning system to automatically measure the points on the part 90 and compare the measured points to the known points; (4) use the local positioning system to take one picture of the LED pattern on the robot base 84 with the LEDs turned on and another with the LEDs off; (5) use the local positioning system to automatically measure the points on the robot base 84 and compare the measured points to the known points; (6) use the localization process to compute the position and orientation offset of the part 90 relative to the robot base 84; and (7) send the position and orientation offset data to the robot controller 80.

The foregoing methodology can be used at the start of each work sequence to establish the relative positions of the base of a robotic arm and a workpiece. The robot controller will be able to compute the position and orientation of the end effector relative to the robot base (using other sensors and kinematics data). If the reference coordinate system is the coordinate system of the workpiece, then the system shown in FIG. 8 can determine the position of the base of the robotic arm (and the end effector) in the workpiece coordinate system. Conversely, if the reference coordinate system is the coordinate system of the robot base, then the system can determine the position of the workpiece in the robot base coordinate system.

In summary, the location tracking system disclosed above uses a single camera, can be integrated with odometry-based tracking, and is able to track multiple objects (in a sequential manner if measurement sequences are phase shifted). When integrated with encoder-based odometry, the system is tolerant of intermittent occlusion. Also the system is not affected by magnetic fields or ferrous materials.

While a location tracking methodology has been described with reference to various embodiments, it will be understood by those skilled in the art that various changes may be made and equivalents may be substituted for elements thereof without departing from the scope of the teachings herein. In addition, many modifications may be made to adapt the teachings herein to a particular situation without departing from the scope thereof. Therefore it is intended that the claims not be limited to the particular embodiments disclosed herein.

As used in the claims, the term "computer system" should be construed broadly to encompass a system having at least one computer or processor, and which may have multiple computers or processors that communicate through a network or bus. As used in the preceding sentence, the terms "computer" and "processor" both refer to devices comprising a processing unit (e.g., a central processing unit) and some form of memory (i.e., computer-readable medium) for storing a program which is readable by the processing unit.

As used herein, the term "location" comprises position in a fixed three-dimensional coordinate system and orientation relative to the coordinate system; and the term "active target marker" means an activatable target marker (i.e., an "active target marker" can be switched between active and inactive states).

The method claims set forth hereinafter should not be construed to require that the steps recited therein be performed in alphabetical order (alphabetical ordering in the claims is used solely for the purpose of referencing previously recited steps) or in the order in which they are recited. Nor should they be construed to exclude any portions of two or more steps being performed concurrently or alternatingly.

APPENDIX

Figure 10:
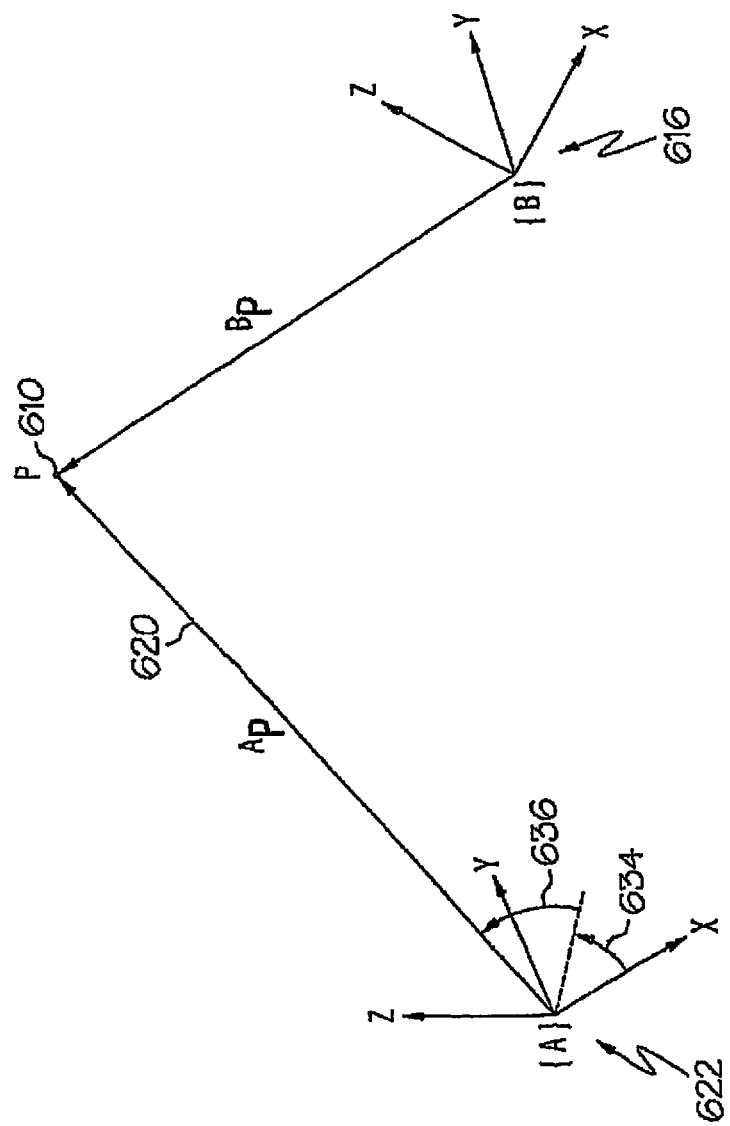
FIG. 10 is a diagram referred to in the Appendix and showing a position vector $^{A}P$ extending from the origin of an instrument coordinate system {A}, substantially along the aim point axis of the instrument, to a point of interest P and showing a position vector $^{B}P$ extending from the origin of a target object coordinate system {B} to the point of interest P.

FIG. 10 shows a position vector $^{A}P$ extending from the origin of an instrument coordinate system {A}, substantially along the aim point axis of the instrument, to a point of interest P and showing a position vector $^{B}P$ extending from the origin of a target object coordinate system {B} to the point of interest P.

Referring to FIG. 10, when the coordinates of a point P in the instrument coordinate system 622 are spherical coordinates of pan (i.e., the pan angle 634 in FIG. 10 of a vector $^{A}P$ to the point P), tilt (the tilt angle 636 in FIG. 10 of the vector $^{A}P$ to the point P), and range (the distance along the vector $^{A}P$ to the point P in FIG. 10), the position of the point P represented as spherical coordinates in the instrument coordinate system 622 is related to the position of the point P in X,Y,Z Cartesian coordinates in the instrument coordinate system 622 from the following equations for the forward kinematics of the instrument 618:

$$X = \text{Range} * \cos(\text{pan}) * \cos(\text{tilt})$$

$$Y = \text{Range} * \sin(\text{pan}) * \cos(\text{tilt})$$

$$Z = \text{Range} * \sin(\text{tilt})$$

where pan (azimuth) is rotation about the Z axis and tilt (elevation) is rotation about the Y axis in the instrument coordinate system 622.

It is noted that the position of the point P represented as Cartesian coordinates (X,Y,Z) in the instrument coordinate system 622 is related to the position of the point P represented as spherical coordinates (pan, tilt, range) in the instrument coordinate system 622 from the following equations for the inverse kinematics of the instrument 618:

$$\text{pan} = \tan(Y,X)^{-1}$$

$$\text{tilt} = \tan(Z, \sqrt{X^2+Y^2})^{-1}$$

$$\text{Range} = \tan\sqrt{X^2+Y^2+Z^2}$$

In one implementation, a position $^BP$ (which is represented as a column vector in the form $[X,Y,Z,1]^T$) in the target object coordinate system 616 is calculated from a position $^AP$ (also a column vector in the form $[X,Y,Z,1]^T$) in the instrument coordinate system 622 from the equation:

$$^BP = {_A^B}T {^AP} \quad (1)$$

where T is the calibration matrix. In one example, the calibration matrix is a 4×4 homogeneous transformation matrix having the form:

$$_A^BT = \begin{bmatrix} r_{11} & r_{12} & r_{13} & X \\ r_{21} & r_{22} & r_{23} & Y \\ r_{31} & r_{32} & r_{33} & Z \\ 0 & 0 & 0 & 1 \end{bmatrix} \quad (2)$$

It is noted that a position $^AP$ in the instrument coordinate system 622 can be calculated from a position $^BP$ in the target object coordinate system 616 using the inverse of the calibration matrix from the equation:

$$^AP = (_A^BT)^{-1} {^BP} = (_B^AT) {^BP} \quad (3)$$

Figure 11:
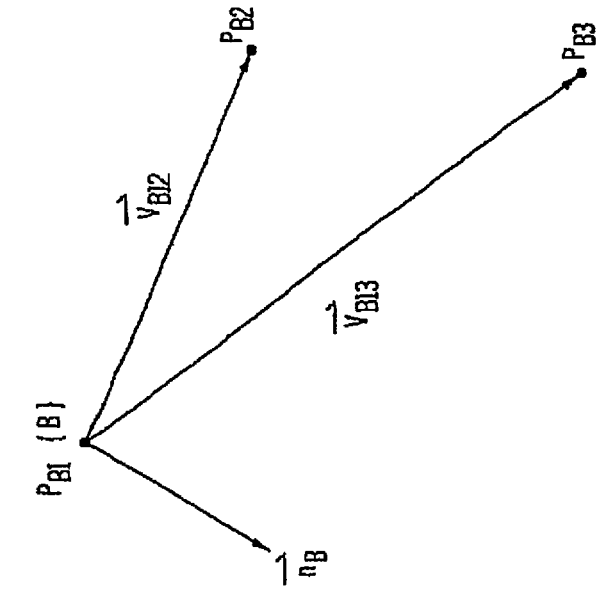
FIGS. 11-13 are diagrams referred to in the Appendix, where an illustrative method for calculating a calibration matrix for coordinate system transformation is described.
Figure 11:
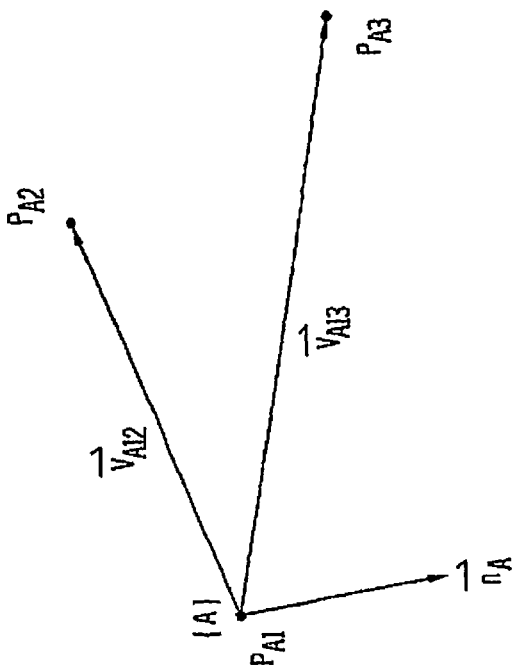
Figure 12:
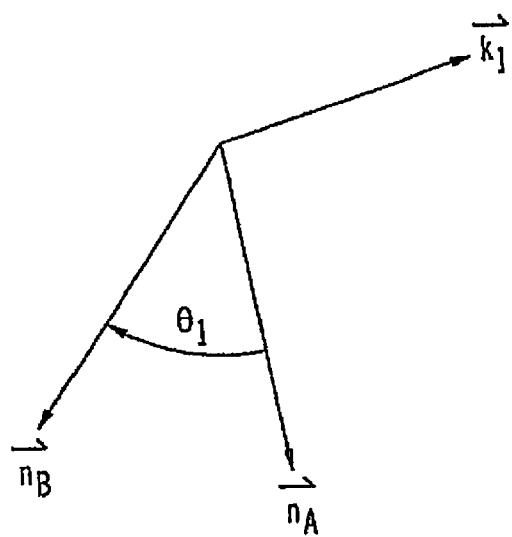
Figure 13:
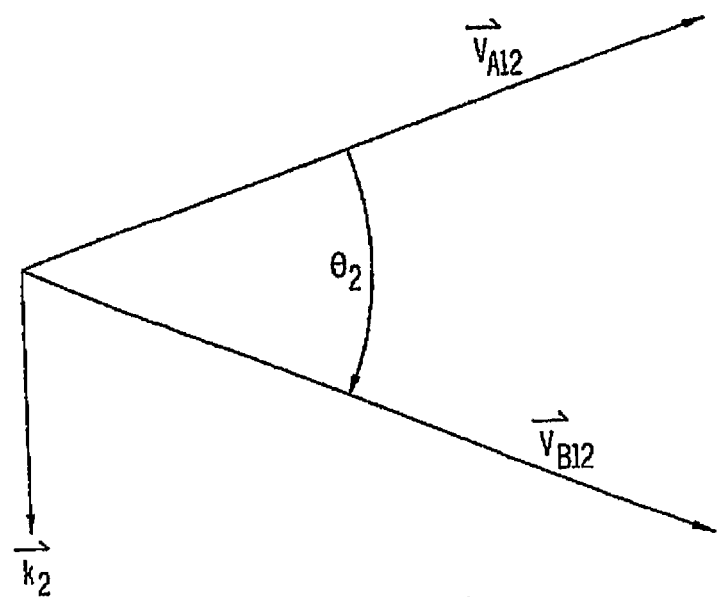

The transformation matrix $_A^BT$ is computed as follows. For situations where the direction and length of the vectors to the calibration points are known, the minimum number of calibration points is three, assuming that they are non-collinear. The basic three-point technique is as follows:

$$\vec{n}_A = \vec{V}_{A12} \times \vec{V}_{A13}$$

$$\vec{n}_B = \vec{V}_{B12} \times \vec{V}_{B13}$$

$$\vec{k}_1 = \vec{n}_A \times \vec{n}_B$$

$$\theta_1 = \alpha\cos(|\vec{n}_A| \cdot |\vec{n}_B|)$$

$$R_1 = f_1(|\vec{k}_1|, \theta_1)$$

$$\vec{k}_2 = \vec{V}_{A12} \times \vec{V}_{B12}$$

$$\theta_2 = \alpha\cos(|\vec{V}_{A12}| \cdot |\vec{V}_{B12}|)$$

$$R_2 = f_1(|\vec{k}_2|, \theta_2)$$

$$R_{12} = R_1 R_2$$

$$_A^BT = [R_{12}, [R_1(\vec{V}_{B12} - \vec{V}_{A12})]^T]$$

$$_B^AT = (_A^BT)^{-1}$$

wherein, referring to FIGS. 11-13:

$\vec{V}_{A12}$ is the vector in coordinate system A that extends from point $P_{A1}$ to $P_{A2}$;

$\vec{V}_{A13}$ is the vector in coordinate system A that extends from point $P_{A1}$ to $P_{A3}$;

$\vec{V}_{B12}$ is the vector in coordinate system A that extends from point $P_{B1}$ to $P_{B2}$;

$\vec{V}_{B13}$ is the vector in coordinate system A that extends from point $P_{B1}$ to $P_{B3}$;

$\vec{n}_A$ and $\vec{n}_B$ are the normals created from the vector cross products;

$\vec{k}_1$ and $\vec{k}_2$ are axes of rotation;

$\theta_1$ and $\theta_2$ are rotation angles about axes $\vec{k}_1$ and $\vec{k}_2$, respectively;

$R_1$, $R_2$, and $R_{12}$ are 3×3 symmetric rotation matrices; and $f_1()$ is the function (known to those skilled in the art and described, for example, in "Introduction to Robotics: Mechanics and Control", 3rd edition, by John J. Craig and published July 2004 by Prentice Hall Professional Technical Reference) which generates a 3×3 rotation matrix from the angle-axis definition described below:

$$f_1(\hat{k}, \theta) = \begin{bmatrix} k_x k_x v\theta + c\theta & k_x k_y v\theta - k_z s\theta & k_x k_z v\theta + k_y s\theta \\ k_x k_y v\theta + k_z s\theta & k_y k_y v\theta + c\theta & k_y k_z v\theta - k_x s\theta \\ k_x k_z v\theta - k_y s\theta & k_y k_z v\theta + k_x s\theta & k_z k_z v\theta + c\theta \end{bmatrix}$$

where $c\theta = \cos(\theta)$, $s\theta = \sin(\theta)$, $v\theta = 1 - \cos(\theta)$, and $\vec{k} = [k_x, k_y, k_z]$.

The X, Y and Z values in the transformation matrix of Eq. (2) are computed based on the difference in position of the origin of the target object coordinate system from an initial position to a current position. The origin can be defined anywhere on the target object.

Note that the 4×4 homogeneous calibration matrix $_A^BT$ only is computed once for any position of the pointing instrument relative to the target object, and $_A^BT$ can then be used to convert any number of vectors from coordinate system A (the instrument coordinate system 622) into coordinate system B (the target object coordinate system 616). It is also noted that the inverse calibration matrix $_B^AT$ can be calculated by calculating the inverse of the calibration matrix $_A^BT$ or can be calculated directly by switching the order of the vectors in the equations.

The invention claimed is:

1. A method for controlling motion of a target object equipped with at least three active target markers arranged in a known pattern, comprising:
    (a) defining a location of a camera with respect to a reference coordinate system;
    (b) while the target object is stationary, aiming the camera so that the at least three active target markers on the target object are within a field-of-view of the camera;
    (c) while the camera and target object are in states recited in step (b) and the active target markers are not on, capturing an image of the target object;
    (d) while the camera and target object are in the states recited in step (b), activating the at least three active target markers at the same time or at different times and then capturing an image or images of the target object;

(e) processing the images captured in steps (c) and (d) to compute respective average pixel coordinates corresponding to respective active target markers;

(f) for respective active target markers and while the camera and target object are in the states recited in step (b), aiming a laser range finder and transmitting a laser beam in a direction defined by respective pan and tilt angles which are a function of at least pan and tilt angles at which the field-of-view of the camera was aimed at the target object and differences between the respective average pixel coordinates and pixel coordinates of a center of the images;

(g) for respective active target markers and while the camera and target object are in the states recited in step (b), acquiring respective range, pan and tilt data subsequent to the transmission of a respective laser beam;

(h) computing coordinates of respective points corresponding to the at least three active target markers in the reference coordinate system based on the measured range, pan and tilt data;

(i) comparing respective positions of the respective points whose coordinates were computed from measured data to respective positions of respective points arranged in the known pattern to determine a current position and orientation of the target object defined in terms of the reference coordinate system;

(j) comparing the current position and orientation of the target object to a desired position and orientation of the target object;

(k) activating the target object to move incrementally from the current position and orientation toward the desired position and orientation;

(l) tracking the incremental movements of the target object; and (m) stopping the target object when results of step (l) indicate that the target object has attained the desired position and orientation.

2. The method as recited in claim 1, wherein step (e) comprises:
processing the images to compute a difference image representing differences between the image captured while all of the at least three active target markers were not on and images captured while one or more of the at least three active target markers were on; and
computing respective average pixel coordinates for the differences in the difference image corresponding to respective active target markers.

3. The method as recited in claim 2, wherein processing the images to compute a difference image comprises:
segmenting the difference image to include separate areas corresponding to the active target markers based on said differences; and
computing respective average pixel coordinates in the difference image for a respective centroid of each separate area corresponding to the active target markers.

4. The method as recited in claim 1, wherein the known pattern is asymmetric.

5. The method as recited in claim 1, generating encoder pulses in response to incremental motion of the target object during movement from the current position and orientation to the desired position and orientation.

6. The method as recited in claim 1, wherein incremental movements of the target object are tracked using differential odometry.

7. A system for controlling motion of a target object equipped with at least three active target markers arranged in a known pattern comprising:

a pan-tilt mechanism;
a camera and a laser range finder mounted to said pan-tilt mechanism; and
a computer system programmed to execute the following operations:
adjusting pan and tilt angles of said pan-tilt mechanism to center said camera on said target object with said active target markers within an image field-of-view of said camera;
commanding said camera to capture an image while said camera is centered on said target object and said active target markers are not on;
commanding said camera to capture one or more images while said camera is centered on said target object and one or more of said active target markers are on;
processing the images to compute a difference image representing differences between an image captured while all of said active target markers were not on and an image or images captured while said active target markers were on at a same time or different times;
computing respective average pixel coordinates for the differences in the difference image corresponding to respective active target markers;
for respective active target markers, commanding said laser range finder to transmit respective laser beams directed at respective pan and tilt angles which are a function of at least pan and tilt angles at which said target object was centered in the image field-of-view and differences between the respective average pixel coordinates and pixel coordinates of a center of the indicator image;
for respective active target markers, commanding said pan-tilt mechanism to acquire respective pan and tilt data and commanding said laser range finder to acquire respective range data subsequent to transmission of a respective laser beam;
computing coordinates of respective points corresponding to said active target markers in a reference coordinate system based on measured range, pan and tilt data;
comparing respective positions of the respective points whose coordinates were computed from measured data to respective positions of respective points arranged in the known pattern to determine a current position and orientation of the target object defined in terms of the reference coordinate system;
comparing the current position and orientation of the target object to a desired position and orientation of the target object;
activating the target object to move incrementally from the current position and orientation toward the desired position and orientation;
tracking changes in position and orientation of the target object during the incremental movement; and
stopping the target object when tracking results indicate that the target object has attained the desired position and orientation.

8. The system as recited in claim 7, wherein said active target markers are light-emitting diodes.

9. The system as recited in claim 7, wherein said target object comprises a crawler vehicle.

10. The system as recited in claim 9, wherein said crawler vehicle is a holonomic motion crawler vehicle.

11. The system as recited in claim 7, wherein said target object comprises a moveable base of a robotic arm.

12. The system as recited in claim 7, wherein changes in the position and orientation of the target object are tracked using differential odometry.

* * * * *